United States Patent
Lebda et al.

(10) Patent No.: US 6,611,816 B2
(45) Date of Patent: *Aug. 26, 2003

(54) METHOD AND COMPUTER NETWORK FOR CO-ORDINATING A LOAN OVER THE INTERNET

(75) Inventors: Douglas Lebda, Charlotte, NC (US); Richard Stiegler, Weddington, NC (US)

(73) Assignee: LendingTree, Inc., Charlotte, NC (US)

( * ) Notice: Subject to any disclaimer, the term of this patent is extended or adjusted under 35 U.S.C. 154(b) by 24 days.

This patent is subject to a terminal disclaimer.

(21) Appl. No.: 10/080,891

(22) Filed: Feb. 22, 2002

(65) Prior Publication Data

US 2002/0077970 A1 Jun. 20, 2002

Related U.S. Application Data

(63) Continuation of application No. 09/075,136, filed on May 8, 1998, now Pat. No. 6,385,594.

(51) Int. Cl.[7] .............................................. G06F 17/60
(52) U.S. Cl. ................................. 705/38; 705/1; 705/35
(58) Field of Search ................................. 705/1, 35, 38

(56) References Cited

U.S. PATENT DOCUMENTS

| | | | |
|---|---|---|---|
| 4,346,442 A | 8/1982 | Musmanno | 705/36 |
| 4,736,294 A | 4/1988 | Gill et al. | 705/38 |
| 5,136,501 A | 8/1992 | Silverman et al. | 705/37 |
| 5,231,571 A | 7/1993 | D'Agostino | 705/36 |
| 5,375,055 A | 12/1994 | Togher et al. | 705/37 |
| 5,383,113 A | 1/1995 | Kight et al. | 705/40 |
| 5,535,407 A | 7/1996 | Yanagawa et al. | 705/39 |
| 5,659,731 A | 8/1997 | Gustafson | 705/4 |
| 5,696,907 A | 12/1997 | Tom | 705/38 |
| 5,699,527 A | 12/1997 | Davidson | 705/38 |
| 5,701,451 A | 12/1997 | Rogers et al. | 701/1 |
| 5,706,434 A | 1/1998 | Kremen et al. | 709/218 |
| 5,708,825 A | 1/1998 | Sotomayor | 707/501.1 |
| 5,754,850 A | 5/1998 | Janssen | 707/104.1 |
| 5,774,883 A * | 6/1998 | Andersen et al. | 705/38 |
| 5,794,207 A | 8/1998 | Walker et al. | 705/1 |
| 5,797,133 A | 8/1998 | Jones et al. | 705/38 |
| 5,809,484 A * | 9/1998 | Mottola et al. | 705/38 |

(List continued on next page.)

FOREIGN PATENT DOCUMENTS

| | | |
|---|---|---|
| EP | 0512702 | 11/1992 |
| JP | 7121621 | 5/1995 |
| WO | WO 99/59084 | 11/1999 |

OTHER PUBLICATIONS

"IMX® Exchange: The 'Stock Market' of The Mortgage Industry" http://www3.imxexchange.com/about/press/00-01025.html; Jan. 25, 2000.

(List continued on next page.)

Primary Examiner—Tariq R. Hafiz
Assistant Examiner—Akiba Robinson-Boyce
(74) Attorney, Agent, or Firm—King & Spalding, LLP

(57) ABSTRACT

The invention relates to a method and a computer for coordinating an electronic credit application between an Internet user and a plurality of lending institutions via the Internet. This method involves displaying documents in a web site, and receiving credit data forming placed on the web site. After receiving this data a special loan processing computer applies a filter to the data. The filter comprises loan selection criteria provided by lending institutions which allows these institutions to filter out loan applications that they do not want. Next, after the data is filtered, it is transmitted to a plurality of lending institutions. Finally, the computer and the method then controls and coordinates communication between these lending institutions and the Internet user to match borrowers and lenders via the Internet.

24 Claims, 10 Drawing Sheets

U.S. PATENT DOCUMENTS

| | | | | |
|---|---|---|---|---|
| 5,845,265 | A | 12/1998 | Woolston | 705/37 |
| 5,870,721 | A | 2/1999 | Norris | 705/38 |
| 5,878,403 | A | 3/1999 | DeFrancesco et al. | 705/38 |
| 5,907,828 | A | 5/1999 | Meyer et al. | 705/4 |
| 5,924,082 | A | 7/1999 | Silverman et al. | 705/37 |
| 5,930,776 | A | 7/1999 | Dykstra et al. | 705/38 |
| 5,940,811 | A | 8/1999 | Norris | 705/38 |
| 5,940,812 | A | 8/1999 | Tengel et al. | 705/38 |
| 5,966,699 | A | 10/1999 | Zandi | 705/38 |
| 5,995,947 | A | 11/1999 | Fraser et al. | 705/38 |
| 6,014,645 | A | 1/2000 | Cunningham | 705/38 |
| 6,029,149 | A | 2/2000 | Dykstra et al. | 705/38 |
| 6,049,784 | A | 4/2000 | Weatherly et al. | 705/38 |
| 6,064,986 | A | 5/2000 | Edelman | 705/36 |
| 6,208,979 | B1 * | 3/2001 | Sinclair | 705/38 |
| 6,324,524 | B1 | 11/2001 | Lent et al. | 705/38 |
| 6,385,594 | B1 * | 5/2002 | Lebda et al. | 705/38 |

OTHER PUBLICATIONS

"NextCard Awarded Patent Covering Multiple On–Line Offers of Credit and Real–Time Balance Transfers", Dec. 13, 2001, NextCard, Inc., 2 pages.

Duclaux, Denise, "A Check for $5,000, in Ten Minutes", Aug., 1995, American Bankers Association, p. 45.

Block, Valerie, "Network Assembles Card Issuers at an Internet Site", Oct. 13, 1995, American Banker, Inc., p. 11.

"World Wide Web Enhance Customers", Cards International, Nov. 9, 1995, 3 pages.

Desmond, Paul, "Nissan Layers Now Applications on Net: Automaker Builds on Packet Net to Give Buyers Faster Credit Approval, Offer New Tools for Dealers", Network World, vol. 8, N. 25, p. 17(2), Jun. 24, 1991, 1 page. abstract.

"Internet Car Loans", Feb. 19, 1996, vol. 1, Issue 4, Phillips Publishing International, 1 page.

Gold, Steve, Newsbytes, "Major UK Credit Card Issuer Links Over Internet", Jan. 17, 1995, The Gal Group. 2 pages.

Desmond, Paul, "Nissan Layers Now Applications on Net: Automaker Builds on Packet Net to Give Buyers Faster Credit Approval, Offer New Tools for Dealers", Network World, vol. 8, N. 25, p. 17(2), Jun. 24, 1991, 1 page. abstract.

Sugawara, Sandra, "Stocking Up at the ATM; Citibank Machines to Allow Customer to Trade Shares", The Washington Post, Oct. 6, 1994, 2 pages.

Neural Networks: "A Logical Progression in Credit and Marketing Decisions Systems", Credit World, Mar./Apr. 93, vol. 81, Issue 4, p. 26, 8 p. 2 charts 4 diagrams 1 graph, 14 pages. abstract.

* cited by examiner

METHOD AND COMPUTER NETWORK FOR CO-ORDINATING A LOAN OVER THE INTERNET

CROSS REFERENCE TO RELATED APPLICATION

This application is a continuation of U.S. application Ser. No. 09/075,136, filed May 8, 1998 now U.S. Pat. No. 6,385,594 filed May 7, 2002, entitled, "Method and Computer Network for Co-Ordinating a Loan Over the Internet", the entire contents of which are hereby incorporated by reference.

BACKGROUND OF THE INVENTION

1. The Field of the Invention

The invention relates to a process for coordinating loans on a loan processing computer over the Internet. The Internet, a vast collection of computers world wide, is a relatively new medium for both personal and commercial entities to transact business. To conduct business over the Internet, companies must find ways to communicate with potential customers. The two most common forms of communication across the Internet are web pages, and e-mail.

2. The Prior Art

Various methods are known for presenting web pages over the Internet. For example, information about the Internet and web browsers can be found in U.S. Pat. No. 5,701,451 to Rogers et al., which is incorporated herein by reference. Rogers et al., details how requests of a web browser are processed. The Rogers invention speeds up the process for receiving requests from web browser users and retrieving the required information. U.S. Pat. No. 5,535,407 to Yanagawa et al., details a customer data processing system which is used to assist credit card purchases made in stores. The Yanagawa invention simplifies the way in which credit card purchases are verified at the time of checkout. U.S. Pat. No. 4,346,442 to Musmanno details a securities brokerage-cash management system. The Musmanno invention maintains customer brokerage accounts, charge cards and checking accounts and calculates available credit for purchases of securities.

Until now, there has been no way to apply for credit from a multitude of lending institutions without physically going to or calling each lender and filling out an application. This process was tedious and time consuming. All applications required substantially the same information: name, address, occupation, debt, amount of loan, etc. This invention combines the vast resources and speed of the Internet with additional knowledge of various lending institution's selection criteria to create a simple mechanism whereby an Internet user can apply for credit from a multitude of lending institutions.

SUMMARY OF THE INVENTION

To overcome these limitations, it is therefore an object of the present invention to provide a fast, convenient process to apply for credit from a large number of lending institutions. In accordance with our invention, needless repetitive applications are eliminated.

It is a further object of the present invention to provide a universal credit application over the Internet and to allow the Internet user to submit a single credit application to a plurality of lending institutions who then make offers to the customer via the Internet.

To achieve these and other objects of the invention, there is provided a method and apparatus for coordinating an electronic credit application between an Internet user and a plurality of lending institutions via the Internet. The method comprises the steps of displaying a plurality of documents to an Internet user, receiving a plurality of credit data sent from the Internet user; matching an electronic credit application to a filter comprising a plurality of selection criteria; transmitting the credit data to a plurality of lending institutions via one of four methods; and responding to the Internet user via the Internet. The documents sent to the Internet user includes a series of questions pertaining to their desired loan, followed by the appropriate type of loan application. The various types of loan applications include first and second mortgages, car loans, student loans, personal loans, and credit card applications. Other types of credit applications may exist without departing from the spirit of the invention. Upon completion of the application, the invention matches a unique filter to the credit data entered by the Internet user.

The filter is made up of a plurality of selection criteria in which a specific lending institution has given to the inventor. The filter is customizable by the specific lending institution in real time and unique to each lending institution. Once the application has been filtered, it is sent to a list of lending institutions that match with the credit application. These lending institutions then reply as to whether the application has been accepted or rejected.

The information can be sent in many different ways. For example, the information can be sent in an Active File Transfer system (AFTS), via e-mail, through a secured webpage or through a Common Gateway Interface (CGI). In addition, since much of the information relayed between the network of computers is private information, it is encrypted before it is sent from one computer to another.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 1:
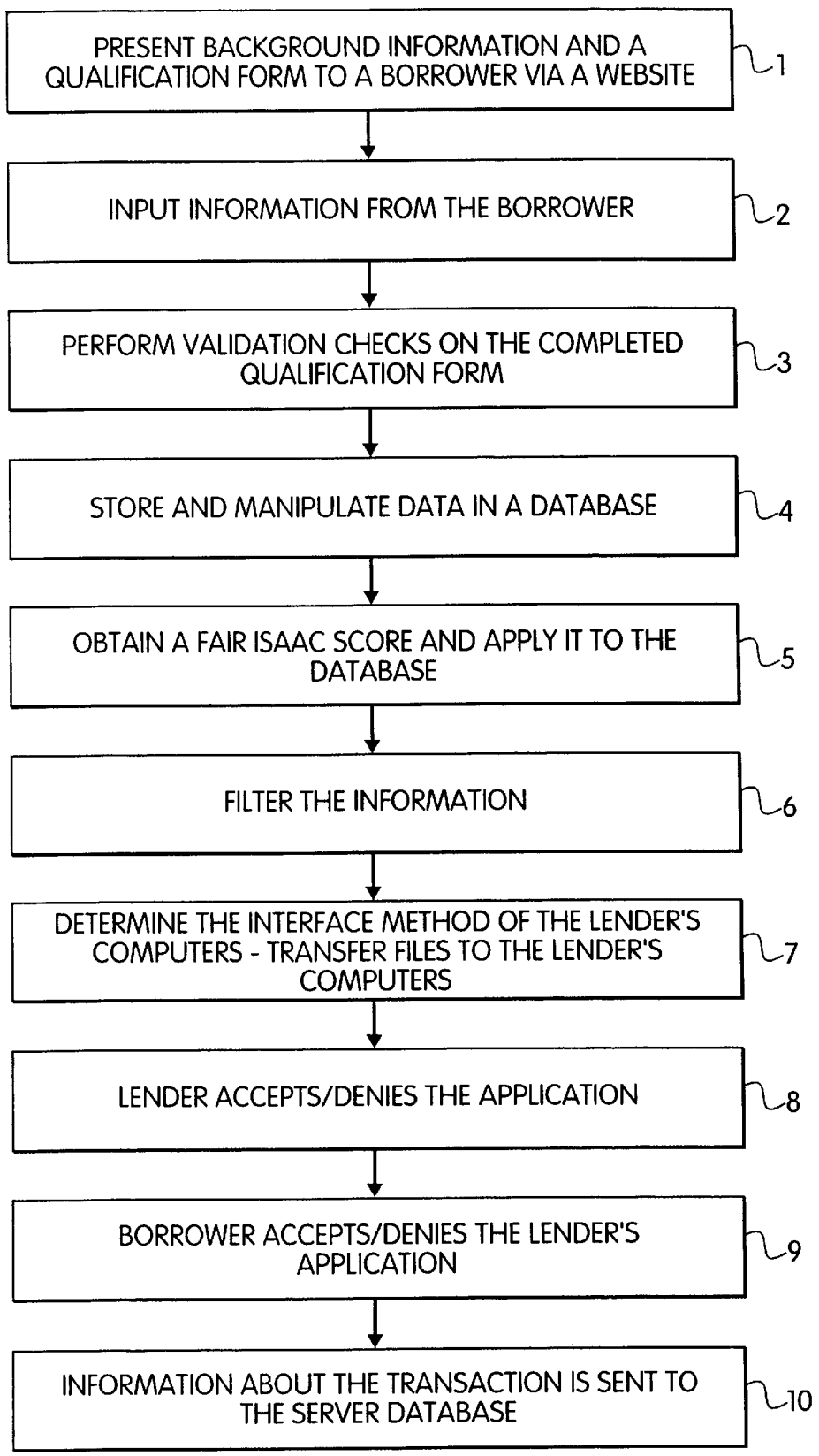
FIG. 1 shows an overview of the method of the invention.

Essentially, the invention is a process and a computer for coordinating loans between lending institutions and borrowers via the Internet. FIG. 1 illustrates the ten general stages in the process required to coordinate an electronic credit application between a prospective borrower and a plurality of lending institutions. For example, in stage 1 the process presents background information and a credit application to a prospective borrower-Internet user on a web site. In stage 2, the prospective borrower inputs information onto the web site. In stage 3, validation checks are performed on this information to make sure that the application is complete and correct. Next, stage 4 involves storing and manipulating the credit application in a database. In stage 5, a Fair Isaac Credit Score is obtained based upon the credit application and that score is matched to the application and stored in the database. Next, in stage 6, the application is filtered where it is compared to a list of criteria presented by a series of lending institutions. If the application passes this list of criteria then in stage 7 the application is sent to each one of those institutions whose criteria match with the application. In stage 8 the lender processes the application and can either accept or deny it. If the lender accepts the application then in stage 9, the borrower can reply stating whether he accepts or denies the lender's application. Finally, in stage 10, information about this transaction is sent to a database to allow lending institutions to have access to their lending history.

Figure 2:
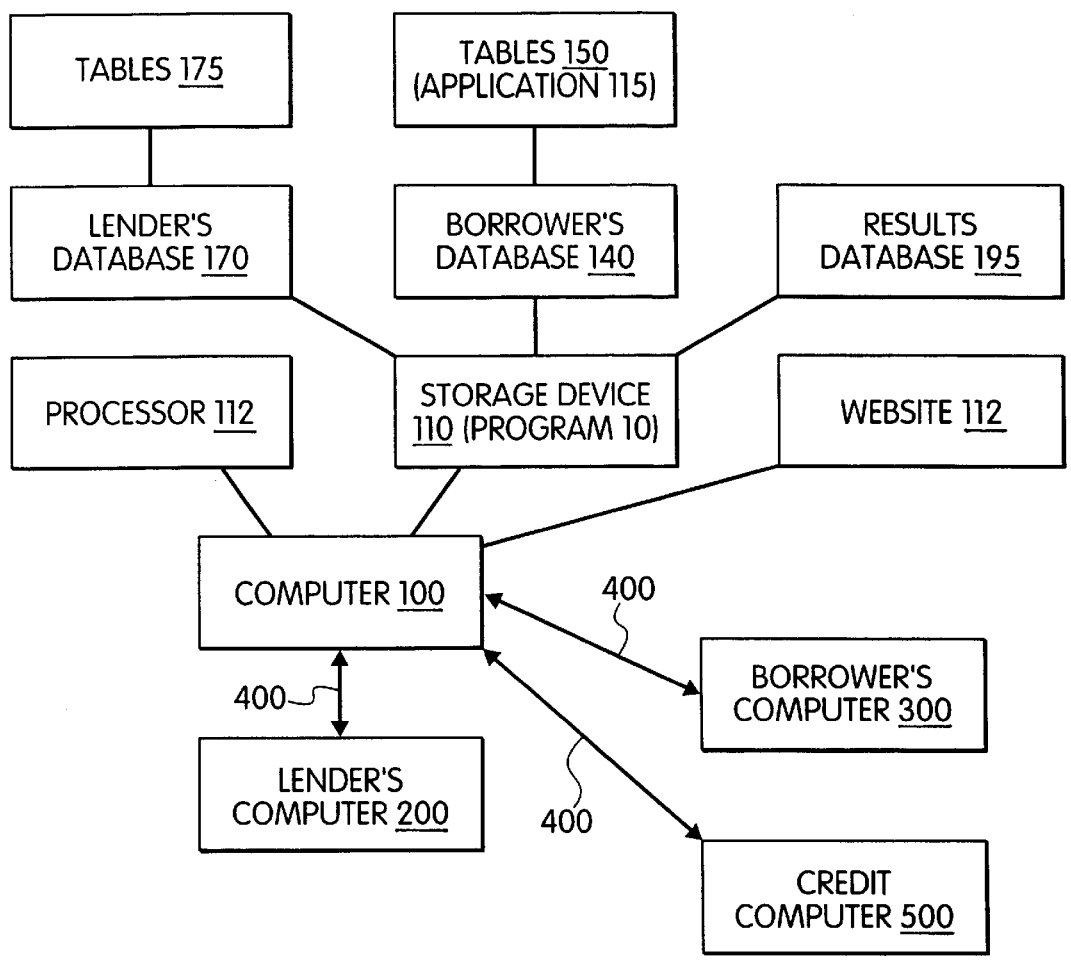
FIG. 2 shows a schematic depiction of network designed to achieve the method of the invention.

For this process to occur, there must be a series of computers connected to each other via telecommunication lines as shown in FIG. 2. Here, computer program 10, controls the process and is housed on loan processing computer 100. Loan processing computer 100 coordinates a loan application between a series of lending institution computers 200, and a plurality of borrower computers 300. Computer program 10 is stored on loan processing computer 100 in storage device 110 and is run by processor 112. Program 10 is designed to transmit and receive information through the Internet via a web browser such as Netscape or Internet Explorer, installed on the computers.

Loan processing computer 100 must have sufficient memory and processor power to project program 10 over the Internet. Therefore, the recommended minimum requirements for processor 12 on computer 100 is an Intel Pentium 200 Mhz processor. The remaining standard components are 64 megabytes of ram, 2 gigabytes of disk space, an Internet connection, additional Ethernet connection, and Windows NT workstation operating system. Computer 100 is installed with one Ethernet interface directly on the Internet, and the other Ethernet interface connected to a firewall storage device 110, to allow disposition of files on a designated server inside the corporate network. In addition computer 100 could be a Unix style server that interfaces with other Unix and non-Unix based computers on the Internet.

Figure 3A:
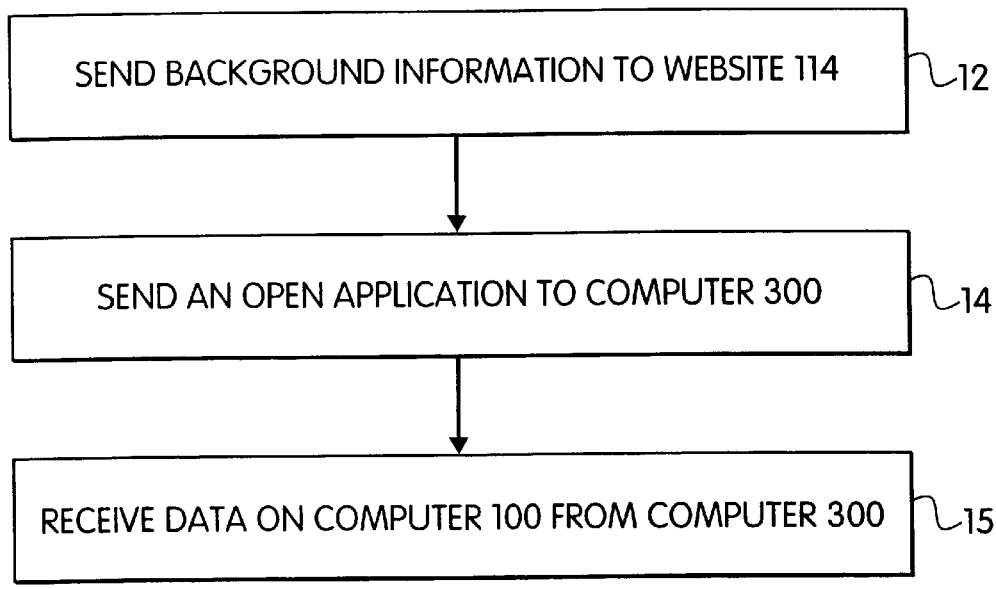
FIG. 3a shows the steps involving the second stage of the lending process.

When program 10 runs on computer 100 it instructs computer 100 to interact with other computers through the Internet to co-ordinate a loan application. For example, as shown in FIGS. 1 and 2, in stage 1, computer 100 allows lender computers 200 to access information on web-page 114 housed in loan processing computer 100 at a predetermined URL address via telecommunication lines 400. In stage 2, computer 100 allows prospective borrowers using satellite computers 300 to view a plurality of documents provided by computer 100. Stage 2 consists of a series of steps that are shown in FIG. 3a. For example, in step 12, computer 100 sends the prospective borrower background information documents to web-site 114 concerning the loan application. These background information documents include a document welcoming the Internet user to the web site, a document explaining the application process, and a document explaining the services provided. In step 14, computer 100 sends an open application to a prospective borrower through the Internet to computer 300. In step 15, the prospective borrower inputs information onto the application. When the prospective borrower wants to send this information back to computer 100 he clicks a "SEND" button which initiates the third stage of the program.

Figure 3B:
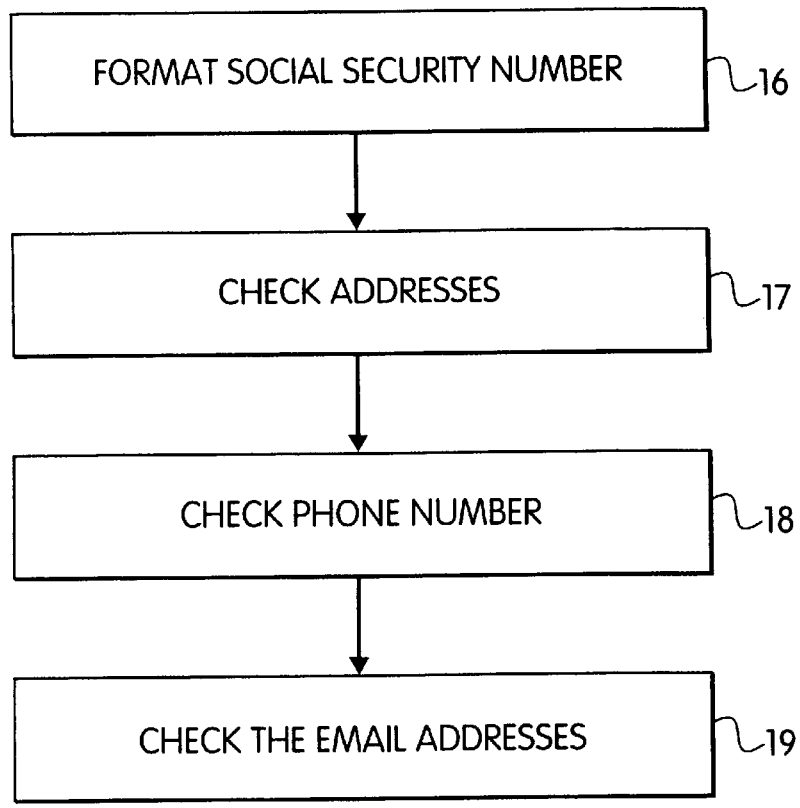
FIG. 3b shows the steps involving the third stage of the lending process.

FIG. 3b outlines stage 3 wherein computer 100 sends a series of instructions to computer 300 to initiate edit and validation checks. In step 16, computer 100 checks the Social Security number entered. In step 17 computer 100 checks the addresses, in step 18 it checks phone numbers, and in step 19 it checks the email addresses entered. The edit and validation checks in stage 3 insure that the data to be received by the database 140 in computer 100 is in the proper format for further processing. If computer 100 determines that the data is in the proper format, then the borrower can then transmit a completed application 115 to a database on computer 100.

Figure 4:
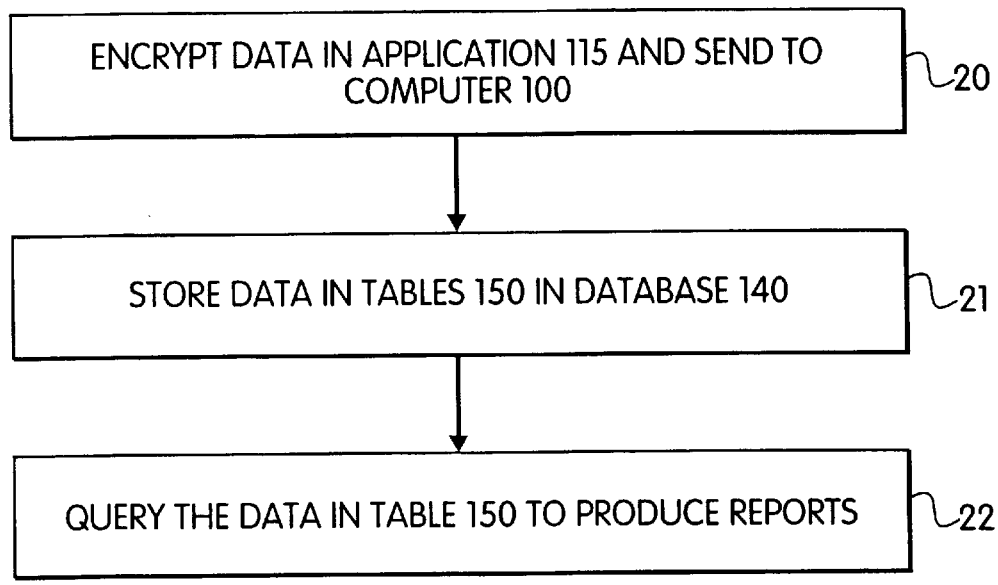
FIG. 4 shows the steps of the fourth stage of the lending process.

FIG. 4 shows stage 4, wherein in step 20 the data from the completed application 115 is encrypted by SSL technology. Next in step 21, at the borrowers instruction, this information is sent to computer 100, unlocked and stored in storage device 110 for further manipulation. In this stage, the data from completed application 115 is sorted and stored in tables 150 in database 140 based on the type of loan requested(i.e. mortgage, home equity, credit card, etc.). Next, in step 22, program 10 queries the data from tables 150 to produce reports providing loan information based on data given any field in the application form (i.e., state of residence, borrower income, etc.).

Figure 5:
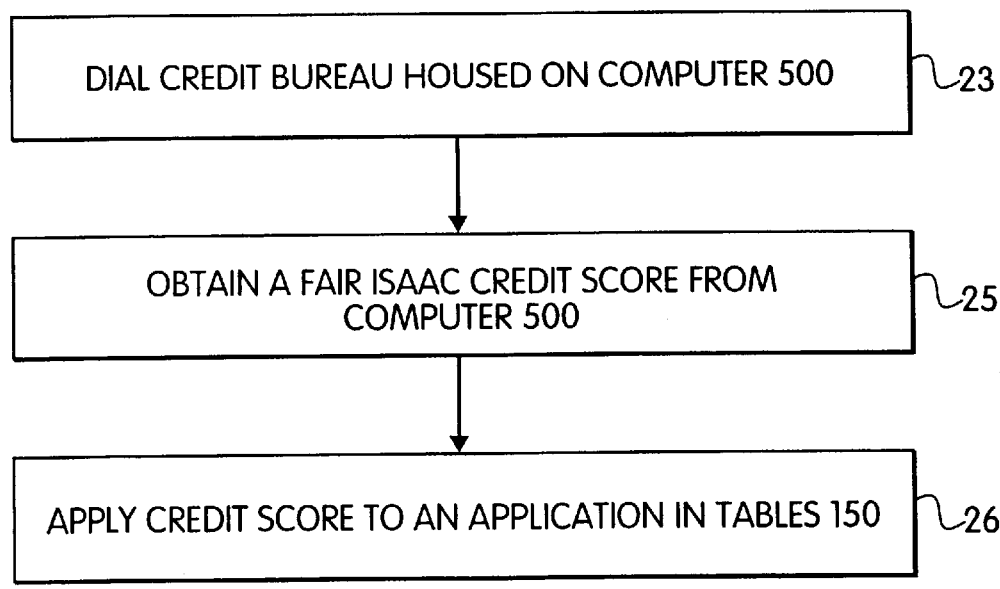
FIG. 5 shows the steps of the fifth stage of the lending process.

In FIG. 5, computer 100 moves into stage 5, wherein in step 23, computer 100 dials to a credit bureau housed on Credit Computer 500 via telecommunication lines 400. In step 25, computer 100 obtains a Fair Isaac Credit Score from computer 500 based upon the data sent to computer 500. Next, in step 26, computer 100 inputs the Fair Isaac Credit Score to the database tables 150. The lenders can use this Fair Isaac Credit Score as one determinant to the borrower's credit risk.

Figure 6:
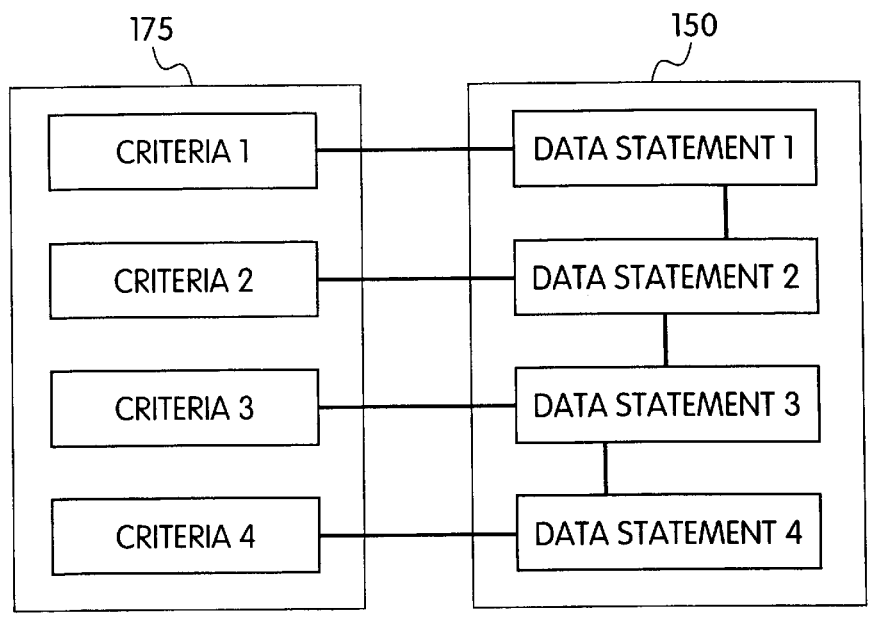
FIG. 6 shows a schematic of the filter process, matching an individual lender to an individual borrower.
Figure 7:
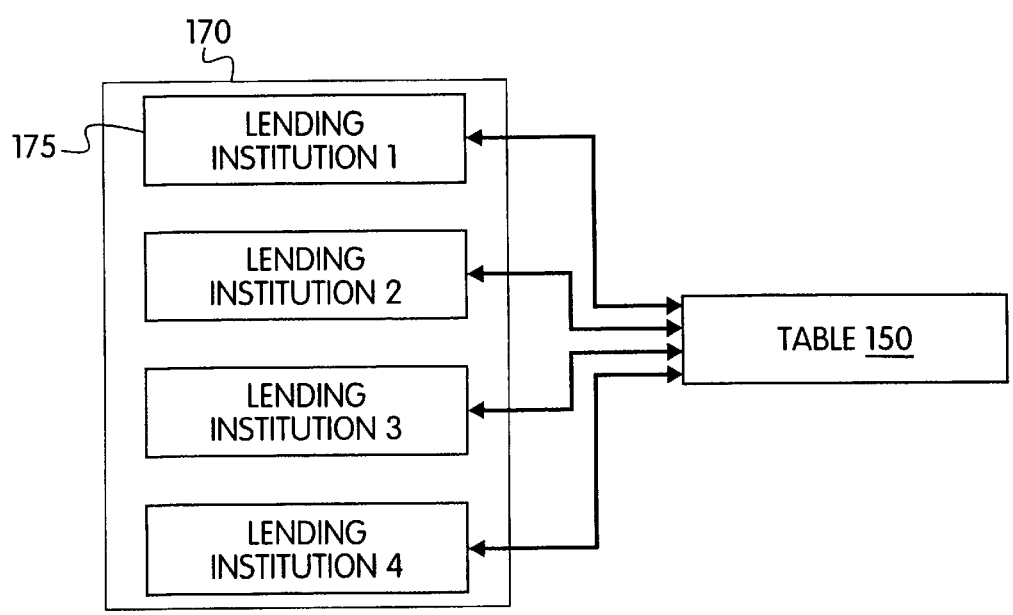
FIG. 7 shows the lending process where an individual lender selects from a plurality of borrowers.
Figure 8:
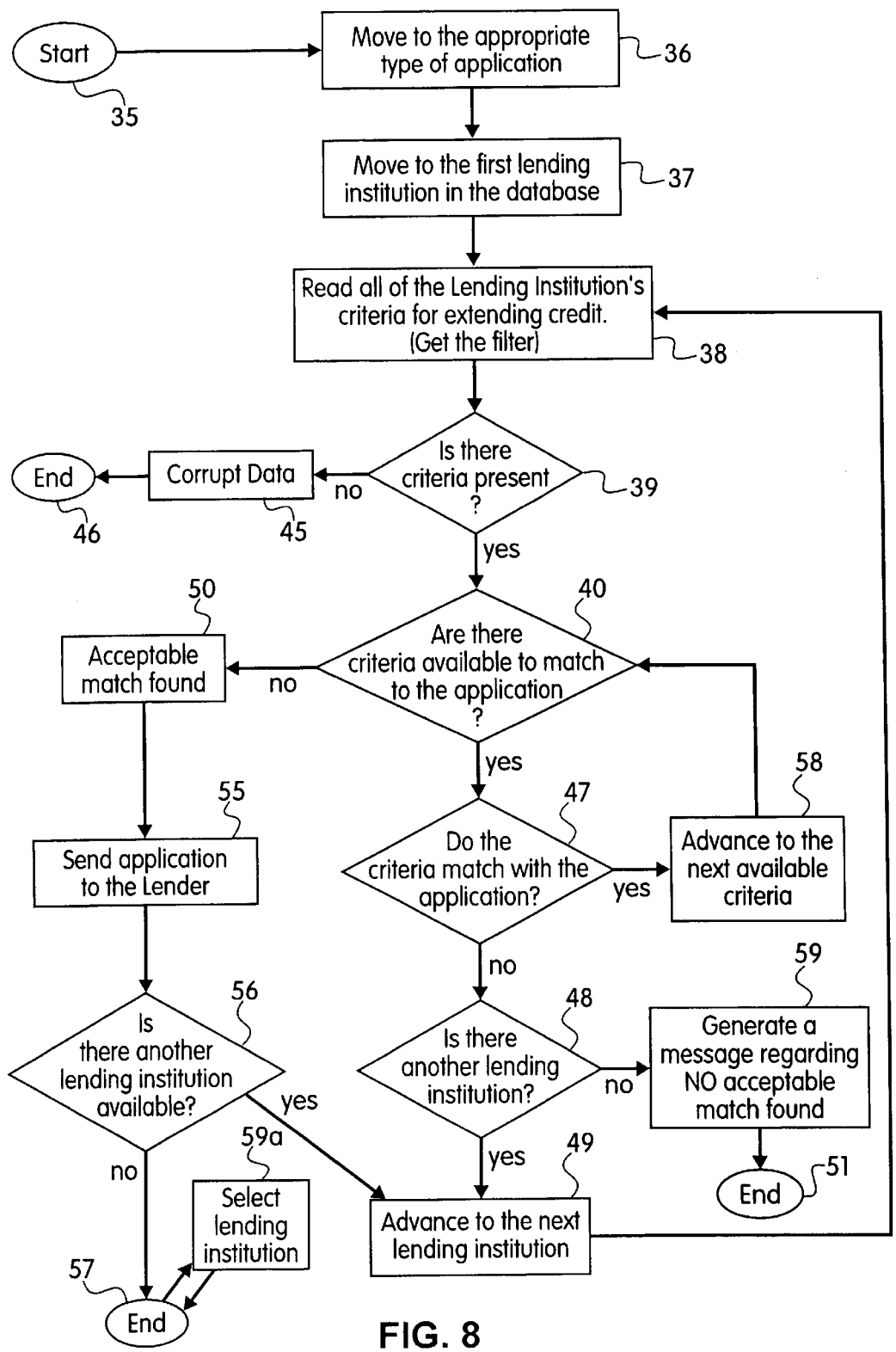
FIG. 8 shows the steps of the sixth stage of the lending process.

FIGS. 6, 7, and 8 show stage 6 of the process, wherein computer 100 runs a filter to match completed application 115 in table 150 against preset criteria established by each lender. As shown in FIG. 6, lender criteria are stored in tables 175 in lender database 170 on computer 100. Wherein in FIG. 7 lender database 170 includes a listing of tables 175 for several lending institutions. The process for matching borrower's application in tables 150 to lender criteria in tables 175 is shown in FIG. 8. For example, in step 35, program 10 starts the filter process. Next, in step 36, the filter process initiates and moves to the appropriate type application 115 in tables 150. Next, in step 37 the filter moves to a first lending institution in table 175. In step 38, program 10 instructs computer 100 to read all of the lending institution's criteria for extending credit. In step 39, program 10 reads whether there are any criteria present in tables 175. If the requested data is not present, next, in step 45 the filter checks to see if there is any database connection that is broken and whether the database information in the message. If the criteria are present, step 40 instructs computer 100 to see whether any remaining criteria to match to application 115 stored on tables 150.

If there are more criteria to match to application 115, then in step 47, program 10 checks to see whether that remaining criteria matches with application 115. If the criteria matches with application 115 then in step 58, program 10 advances to the next available criteria in tables 175. As shown in FIG. 6, step 58 creates a loop back to step 40. If the criteria does not match with application 115, then in step 48, program 10 checks to see whether there is another lending institution in database 170. If there are no remaining lending institutions in database 170 then in step 59, computer 100 generates a message that no acceptable match has been found. After this message, in step 51, the filter process ends.

If there is another lending institution found, then the filter process advances to another lending institution in step 49. Step 49 creates a loop back to step 38 wherein the filter process reads all of the criteria for the new lending institution. This loop continues until in step 40, the filter finds there are no criteria available to match to completed application 115.

If there are no more criteria to match to application 115, then in step 50, the filter determines whether there has been an acceptable match between a borrower and a lender. If there is an acceptable match, then in step 55 the filter selects that lender as a suitable lender for application 115.

In step 56 program 10 checks to see if there is another lending institution available, if yes, then program 10 advances to the next lending institution in step 49. If there are no more lending institutions available, then program 10 advances to step 57 wherein the filter process ends. Finally in step 59a computer 100 selects a limited number of matched lending institutions in which to send application 115. For example, if the filter process matches application 115 with 20 lending institutions, computer 100 may send application 115 to only a fraction of those matched lending institutions. This selection process in step 58 is based upon either random selection or a predetermined set of criteria stored in computer 100.

Figure 9A:
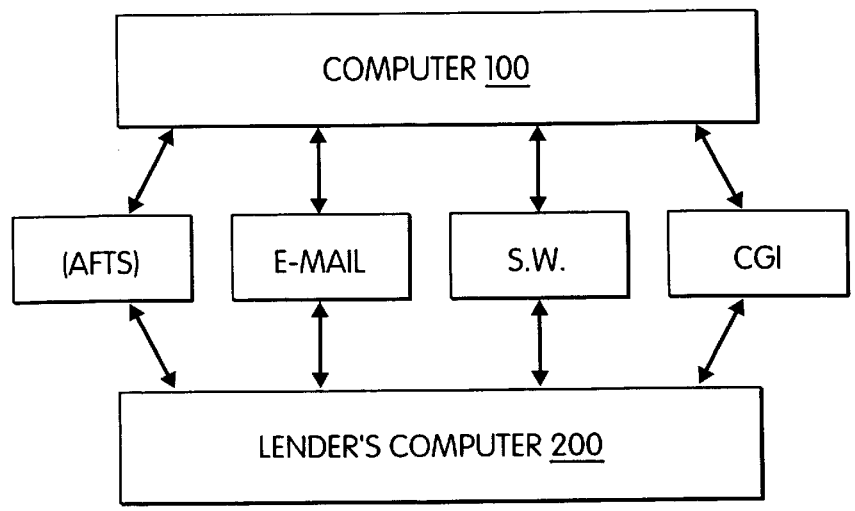
FIG. 9a shows a schematic of the seventh stage of the lending process.

Next, as shown in FIG. 9a in stage 7, program 10 determines the interface method between computer 100 and the selected lending institution computers 200. The interface method can be Common Gateway Interface (CGI), Active File Transfer (AFTS), as a secured file on a secured webpage (S.W.) or via e-mail. Stage 7 allows loan computer 100 to access many different lender sites which thereby allows for greater communication flexibility within the system.

Figure 9B:
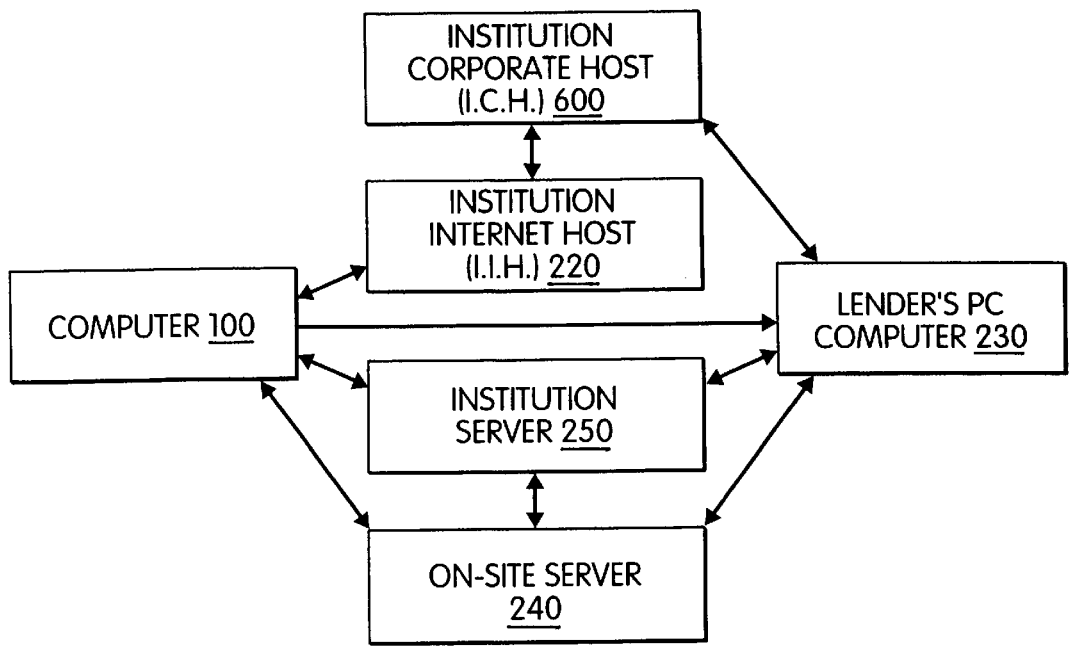
FIG. 9b shows the various transfer methods in the eighth stage of the lending process.
Figure 10:
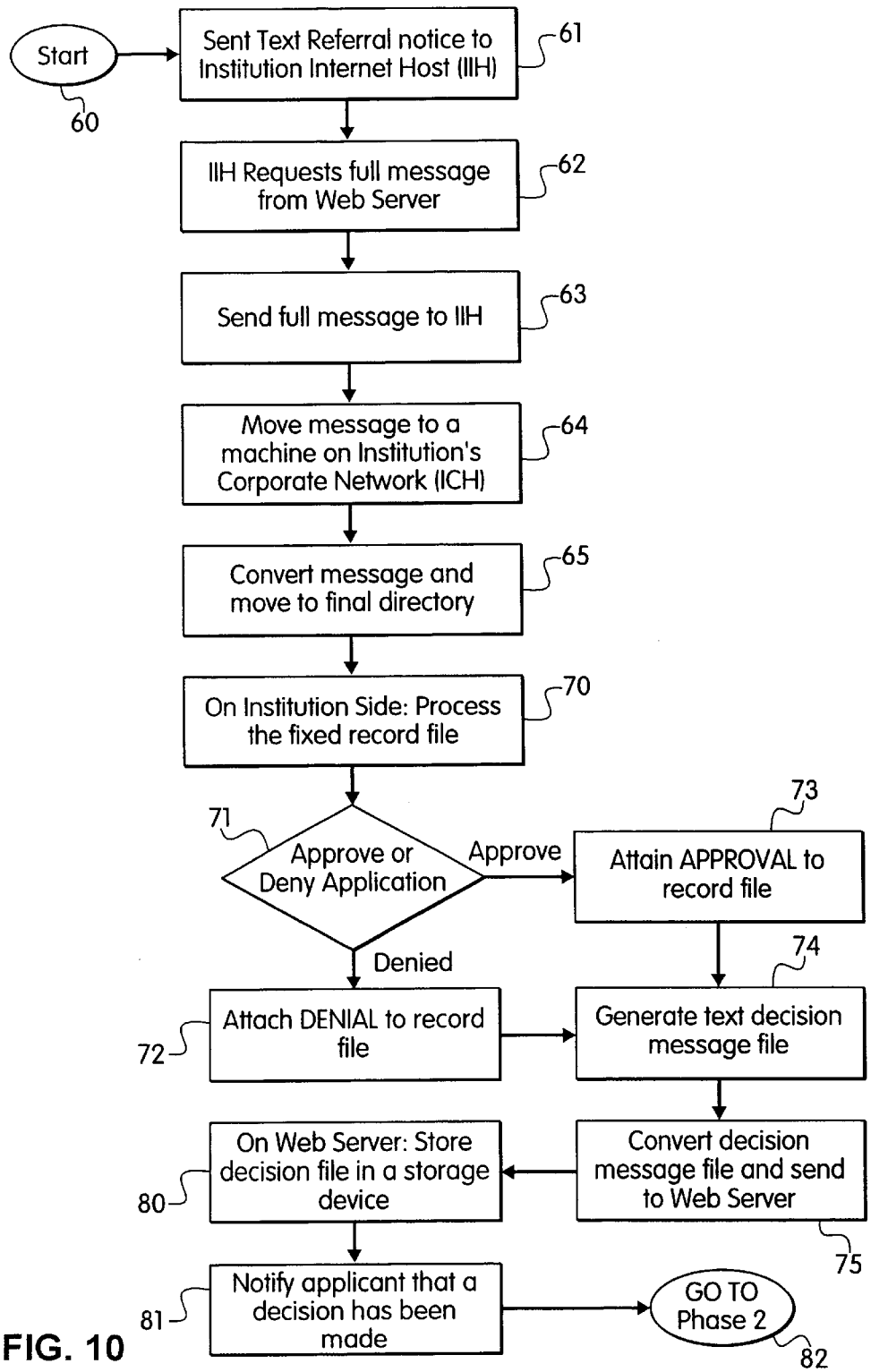
FIG. 10 shows the steps of the Active File Transfer System in the eighth stage in the of the lending process.

In stage 8, as shown in FIGS. 9a, 9b and 10, computer 100 sends data from table 150 via the interface method selected in stage 7 to the lending institutions selected in the filter process of stage 6. FIG. 10 shows the Active File Transfer System (AFTS) of FIG. 9b in greater detail. For example, in step 60, program 10 instructs computer 100 to start the AFTS. Next, in step 61 a text referral notice is sent to The Institution Internet Host (IIH) computer 220. In step 62, IIH computer 220 requests a full message from computer 100. In step 63 computer 100 sends an encrypted full message to IIH computer 220. Next, in step 64 computer 200 moves the message to the Institution's Corporate Network (ICH) 600. In step 65, ICH 600 converts the message from HTML format to a customized fixed record format defined and controlled by the destination institution. Next, in step 70, outside program 10, this information can be processed and stored in the lender's system. In step 71 the lender approves or denies application 115. If the lending institution approves application 115 it attaches an approval to the record file in step 73. Alternatively if the lending institution denies application 115, then in step 72 it attaches a denial to the record file. In step 74, the lender computers 700 generate a text decision message file. This message file is converted from the existing format into HTML format and sent to computer 100 web-site via encrypted transmission in step 75. The text decision message file contains a loan id number and a request for more information from the borrower. Computer 100 next stores the decision file in database 180 in step 80. Next, in step 81, computer 100 notifies an applicant that a decision has been made.

In addition, the data from credit application 115 can also be sent via e-mail with Pretty Good Privacy (PGP) encryption as shown in FIG. 9b. PGP is an encryption program that can be used to encrypt, a binary file to someone, with very high security, without having to exchange a set of private encryption keys beforehand. In this style transfer system, the text of table 150 comprising credit application 115, is transformed into an e-mail text message. Next, the e-mail message is encrypted in PGP format. Finally, computer 100 sends the e-mail message to computer 230 which is a remote networked computer on a lending institution's site.

The third transfer process, that of the secured dynamic website serves as a place for lenders to log in to a website to change their lending criteria filters and to view loan applications. In this process, information is stored on computer 100 in a website that can be accessed by a lender. To access this site, a lender is given a login access account to log into the website that is encrypted by SSL technology. Once the lender logs into the website he can download information relating to a borrower's request for information.

In the fourth transfer method, the Common Gateway Interface (CGI) format is shown in FIG. 9b. There, computer 100 sends data from table 150 to institution server 250 via a Common Gateway Interface (CGI) program. CGI programs allow for a server to server interface over which encrypted information can be transferred. For example, the data located on table 150 is first encrypted. Next the data can be sent from computer 100 to institution server 250. Server 250 next stores and unlocks the encrypted data. This unlocked data can then be read by all other networked computers 230 in a lender's home network.

Figure 11:
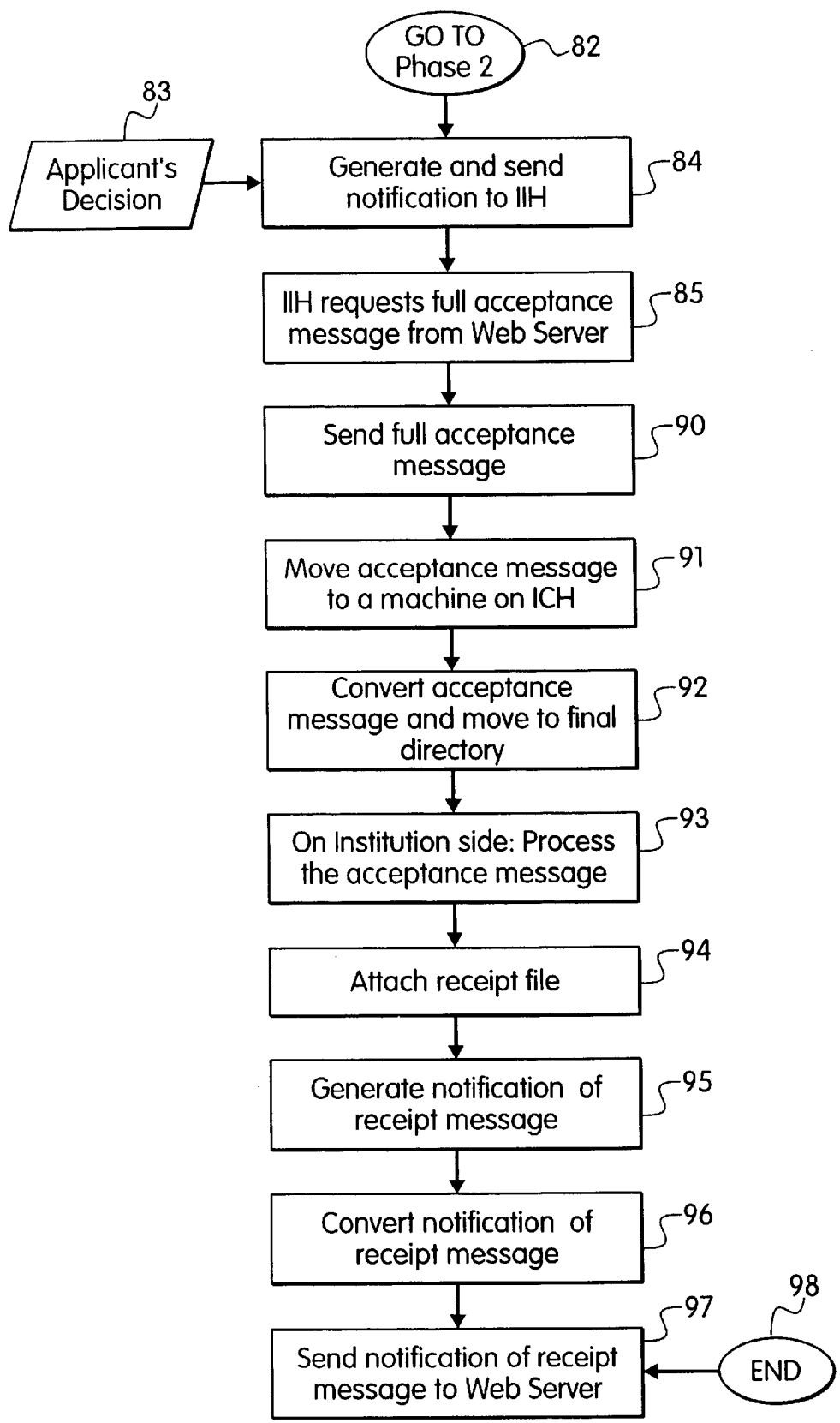
FIG. 11 shows the steps of the Active File Transfer System in the ninth stage of the lending process.

In stage 9, as shown in FIG. 11, computer program 10 moves into the second phase of (AFTS) in step 82. In this stage, the borrower informs the lender of his decision concerning the loan. For example, in step 83 a borrower sends his decision notification from computer 300 to computer 100. Next, in step 84, computer 100 generates and sends a notification to computer 220 (IIH). In step, 85 computer 100 sends a full acceptance message to IIH computer 220 and next moves the acceptance message to ICH computer 600 in step 90. After that, in step 91 ICH computer 600 converts the acceptance message from HTML format and moves it to a final directory 190 on computer 230 (step 91).

At this point the lending institution program takes over so that in step 93, institution computer 230 processes the acceptance message. In step 94, institution computer 230 attaches a receipt file to the acceptance message. In step 95, institution computer 230 generates a notification of receipt message, and in step 96, it converts the notification from its standard database format into HTML format. Finally, in step 97 ICH computer 600 sends a notification of the receipt message to computer 100 and in step 98 the Active File Transfer System ends.

Figure 12:
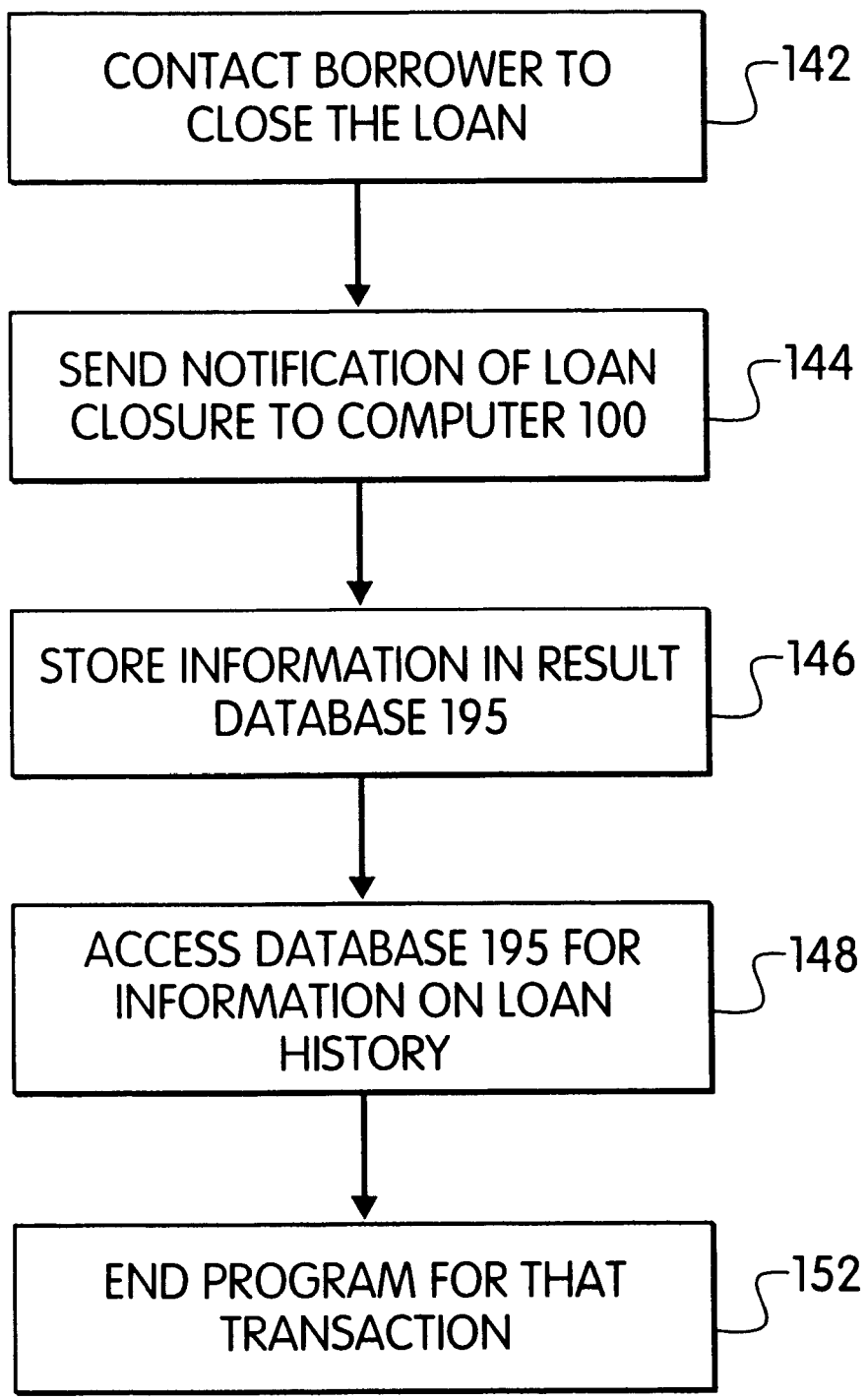
FIG. 12 shows the tenth stage of the lending process.

In the tenth and final stage, as shown in FIG. 12, in step 142 the lender contacts the borrower to coordinate the closing of the loan. Here, the lending institution has the borrower's name, social security number, application id number, phone number at both work and home, and the best time to contact the borrower from the acceptance email sent when the offer was accepted. The loan closing can take place in any way that the lender typically closes loans. Once all documents are signed and delivered from the borrower, the loan is closed. Once the lender closes a loan, in step 144 it contacts computer 100 and sends a notification of the loan closure. In step 146 computer 100 stores this information in result database 195 which can be accessed by the lenders in step 148. Finally in step 152, the process according to the invention ends for that individual transaction.

While several embodiments of the present invention have been shown and described, it is to be understood that many changes and modifications may be made thereunto without departing from the spirit and scope of the invention as defined in the appended claims.

What is claimed is:

1. A method for coordinating an electronic qualification form between a computer user and a plurality of lending institutions via a computer network, comprising the steps of:
   receiving selection criteria from a plurality of lending institutions;
   receiving credit data sent from the computer user;
   employing the selection criteria to filter the credit data and to automatically select one or more lending institutions from the plurality of lending institutions; and
   transmitting the credit data to each of the selected lending institutions;
   whereby the selected lending institutions compete with each other for business with the computer user.

2. The method of claim 1, further comprising the step of determining an appropriate transfer method to forward the credit data to the selected lending institutions.

3. The method of claim 1, further comprising the step of displaying a plurality of positive credit decisions from the selected lending institutions to the computer user.

4. The method of claim 4, further comprising the step of assigning each lending institution a corresponding filter.

5. The method of claim 4, further comprising the step of customizing selection criteria of each filter in response to receiving communications from a corresponding lending institution.

6. The method of claim 1, wherein the step of receiving credit data further comprises receiving credit data from the credit user comprising information relating to one of a first mortgage, a second mortgage, a car loan, a student loan, a personal loan, and a credit card.

7. A method for coordinating business between a computer user and a plurality of lending institutions via a computer network, comprising the steps of:
   storing selection criteria for a plurality of lending institutions;
   receiving credit data sent from the computer user corresponding to an electronic qualification form;
   matching the credit data with lending institutions and the selection criteria by employing the selection criteria to filter the credit data and to automatically select one or more lending institutions from the plurality of lending institutions;
   determining an appropriate transfer method to transmit said electronic qualification form to the lending institutions associated with a match of said credit data;
   transmitting the electronic qualification form to the lending institutions associated with a match of said credit data according to the determined transfer method;
   whereby the selected lending institutions compete with each other for business with the computer user by electing to make offers to the computer user.

8. The method of claim 7, further comprising the step of displaying one or more positive credit decisions from the selected lending institutions to the computer user.

9. The method of claim 7, further comprising transmitting said electronic qualification form to said lending institutions associated with a match of said credit data via a Common Gateway Interface (CGI).

10. The method of claim 7, further comprising transmitting said electronic qualification form to said lending institutions associated with a match of said credit data via a secured website.

11. The method of claim 7, further comprising transmitting said qualification form to said lending institutions associated with a match of said credit data via a secured E-Mail.

12. A method for promoting commerce between a computer user and a plurality of lending institutions via a computer network, comprising the steps of:
   receiving selection criteria from a plurality of lending institutions;
   receiving credit data sent from the computer user;
   matching the credit data with lending institutions and the selection criteria;
   transmitting the credit data to one or more lending institutions associated with a match of the credit data; and
   displaying a plurality of positive credit decisions from one or more of the lending institutions to the computer user or a website via the computer network.

13. The method of claim 11, wherein the step of matching the credit data comprises employing the selection criteria to filter the credit data and to automatically select one or more lending institutions from the plurality of lending institutions.

14. The method of claim 11, further comprising the step of determining an appropriate transfer method to transmit the credit data to the lending institutions associated with a match of said credit data.

15. The method of 14, further comprising the step of transmitting the credit data to the lending institutions associated with a match of said credit data according to the determined transfer method.

16. The method of claim 11, further comprising the step of receiving via the computer network at least one decision from the computer user regarding at least one of the positive credit decisions, the Internet user's decision comprising an acceptance, denial or request for more information regarding a positive decision for one of said lending institutions associated with a match of said credit data.

17. The method of claim 11, further comprising the step of transmitting a computer user's decision regarding a positive credit decision to at least one lending institution corresponding with the positive credit decision so that said Internet user can obtain credit or a loan from one of said lending institutions associated with a match of said credit data.

18. A computer readable medium having computer-executable instructions for coordinating an electronic financial services application between an Internet user and a plurality of financial institutions via the Internet, the instructions comprising the steps of:

receiving selection criteria from one or more financial institutions;

receiving credit data from the Internet user;

applying the credit data to a filter comprising a plurality of selection criteria to automatically select each one of the financial institutions associated with a match of the credit data to the selection criteria;

transmitting the credit data to the selected ones of the financial institutions to assist a determination of offering financial services to the Internet user; and coordinating communication between the selected financial institutions and the Internet user so that the Internet user can accept financial services from one of the selected financial institutions.

19. The computer readable medium of claim 18, wherein the step of coordinating communication further comprises the step of receiving a decision from the Internet user regarding one or more offers made from the selected ones of the financial institutions.

20. The computer readable medium of claim 18, further comprises the step of displaying one or more positive credit decisions from the selected lending institutions to the computer user.

21. The computer readable medium of claim 18, wherein the financial services comprise services relating to one of first mortgages, second mortgages, car loans, student loans, personal loans, and credit cards.

22. A system for coordinating business between a computer user and a plurality of lending institutions comprising:

a processing unit;

a memory storage device; and a program module, stored in said memory storage device for providing instructions to said processing unit;

said processing unit responsive to said instructions of said program module, operable for receiving selection criteria from a plurality of lending institutions;

receiving credit data sent from the computer user;

employing the selection criteria to filter the credit data and to automatically select one or more lending institutions from the plurality of lending institutions; and forwarding the credit data to the selected one or more lending institutions;

whereby the selected lending institutions compete with each other for business with the computer user.

23. The system of claim 22, wherein said processing unit is further operable for determining an appropriate transfer method to forward the credit data to the selected lending institutions.

24. The system of claim 22, wherein said processing unit is further operable for displaying a plurality positive credit decisions from the selected lending institutions to the computer user.

* * * * *

UNITED STATES PATENT AND TRADEMARK OFFICE
CERTIFICATE OF CORRECTION

PATENT NO.   : 6,611,816 B2
DATED        : August 26, 2003
INVENTOR(S)  : Douglas Lebda and Richard Stiegler It is certified that error appears in the above-identified patent and that said Letters Patent is hereby corrected as shown below:

Column 7,
Line 44, "The method of claim 4," should be changed to -- The method of claim 1, --

Column 8,
Line 38, "or a website" should be changed to -- on a website --
Lines 39, 43, 51 and 58, "The method of claim 11," should be changed to -- The method of claim 12, --

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,611,816 B2 | Page 1 of 1 |
| APPLICATION NO. | : 10/080891 | |
| DATED | : August 26, 2003 | |
| INVENTOR(S) | : Lebda et al. | |

It is certified that error appears in the above-identified patent and that said Letters Patent is hereby corrected as shown below:

Title Page, Item (75) Inventors, should read

--(75) Inventors: Douglas Lebda, Charlotte, NC (US); Richard Stiegler, Weddington, NC (US); James F. Bennett, Jr., Wellesley, MA (US)--.

Signed and Sealed this
Twenty-ninth Day of December, 2015

Michelle K. Lee
*Director of the United States Patent and Trademark Office*